No. 869,554. PATENTED OCT. 29, 1907.
F. B. COOK.
AUTOMATIC TESTING AND RESETTING MEANS FOR ELECTROTHERMAL PROTECTORS.
APPLICATION FILED MAY 19, 1906.
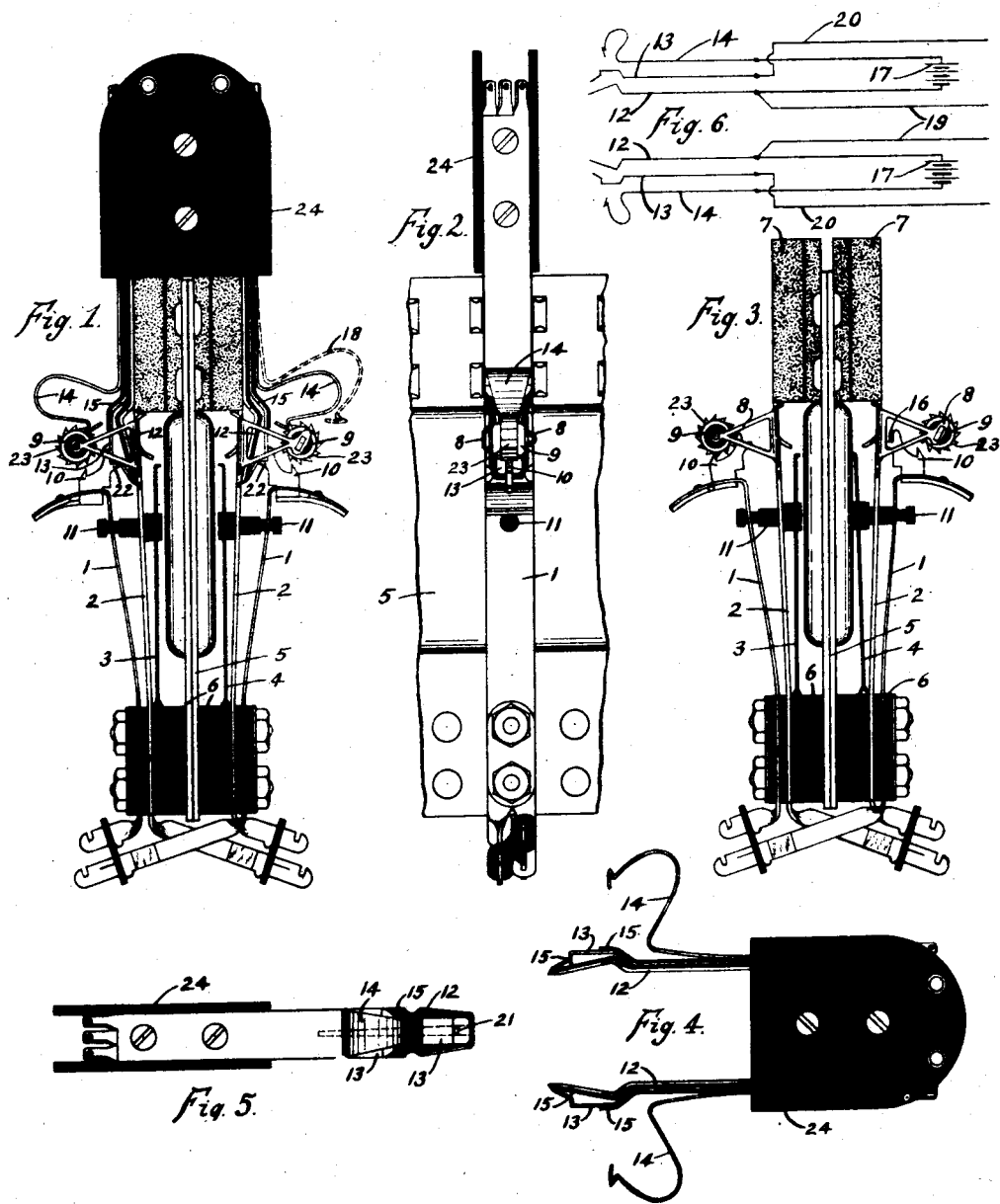
WITNESSES:
Frederick R. Parker.
J. W. Pardee.
INVENTOR:
Frank B. Cook.

UNITED STATES PATENT OFFICE.

FRANK B. COOK, OF CHICAGO, ILLINOIS.

AUTOMATIC TESTING AND RESETTING MEANS FOR ELECTROTHERMAL PROTECTORS.

No. 869,554.        Specification of Letters Patent.        Patented Oct. 29, 1907.

Application filed May 19, 1906. Serial No. 317,837.

*To all whom it may concern:*

Be it known that I, FRANK B. COOK, a citizen of the United States of America, residing at Chicago, in the county of Cook and State of Illinois, have invented a new and useful Automatic Testing and Resetting Means for Electrothermal Protectors, of which the following is a specification, reference being had to the accompanying drawings, illustrating same.

My invention relates to electro-thermal apparatus, and is illustrated in connection with protective apparatus for telephone systems.

The principal objects of my invention are to provide a test plug for such apparatus adapted to automatically test and reset the thermal protectors, to reset the protective apparatus to operative position, and to be used as a test plug for testing the several circuits of the system; and to provide simplicity of construction in such a testing and resetting device.

Other objects will be apparent from the following specification.

In apparatus of the class herein described it is generally customary to set same to operative position by some manual means, without testing the thermal-protectors. If the thermal protectors are tested, this is generally done separately from resetting the apparatus. In my present invention I provide a device which automatically closes a heating current through the thermal protectors, heats same and operates same as a test thereon, and at the same time automatically resets the operated apparatus to operative position. This testing and resetting device may be also used for testing the several circuits through the protective apparatus without testing the thermal protectors.

The broad idea of closing a current of electricity through a thermal protector to reheat same and reset same in the circuit for another operation is contained in my copending application for Letters Patent, Serial No., 271,662, filed July 28th, 1905. A modification of the invention contained in said application Serial No., 271,662, is shown described and claimed in my copending application Serial No., 304,929, filed March 8th, 1906.

Referring to the accompanying drawings, Figure 1 is a side elevation of a pair of telephone protective apparatus with the testing and resetting plug inserted therein; Fig. 2 is an edge elevation of Fig. 1; Fig. 3 is a side elevation of a pair of the protective apparatus without the testing and resetting plug; the apparatus on the left-hand side being shown in set position and that on the right-hand side being shown in operated position; Fig. 4 is a side elevation of the testing and resetting plug only; Fig. 5 is an edge elevation of Fig. 4; and Fig. 6 is a diagram showing the preferred arrangement of circuit wiring for the testing and resetting plug.

Like characters refer to like parts in the several figures.

Spring members 1 1, 2 2, 3 3, and 4 4, are mounted on the ground plate 5 which is preferably formed as shown, and are insulated from each other by suitable insulating washers 6 6. Between the free ends of springs 2 2 and the ground plate 5 are inserted lightning arresters 7 7. Spring members 2 2 are provided with ears 8 8 thereon adapted to hold the thermal protectors 9 9 therebetween. Each thermal protector 9 is provided with a toothed shell 23 inclosing heat-producing means through which a pin is soldered by easily-fusible material. The pin is held stationary by the ears 8 8 and the remainder of the thermal protector is free to turn on the pin when the easily-fusible material is softened. Each spring 1 is provided with a portion 10 adapted to engage a tooth of a thermal protector 9 when the apparatus is in operative position. When an abnormally large current traverses a thermal protector for a sufficient length of time, the easily-fusible material therein becomes softened and allows the portion 10 of spring member 1 to rotate the thermal protector 9 and release itself therefrom as shown on the right of Fig. 3, thus opening the circuit through the protector 9 and allowing the latter to cool. When the thermal protector 9 cools, the easily-fusible material again secures the operable portion thereof to the pin, as originally. When the thermal protector operates, as just described, spring member 1 causes the insulating pin 11 to depress spring members 3 and 4 into contact with ground plate 5 and thereby ground the line spring 2 and close an alarm circuit as will be readily understood. Spring members 2 2 are preferably the line springs and lead to the line conductors, and spring members 1 1 are preferably the switchboard springs and lead to the switchboard conductors. Springs 3 3 are the grounding springs for line springs 2 2, and springs 4 4 are the alarm circuit springs and are preferably connected in common. On each side of ground plate 5, spring members 3 and 4 lie in same plane.

The testing and resetting plug of Fig. 4 is provided with spring members 12 12, 13 13, 14 14, suitably mounted on a handle portion 24 and insulated from each other by strips of insulation 15 15. Spring members 12 12 are adapted to engage line springs 2 2, spring members 13 13 are adapted to engage portions 16 16 of switchboard springs 1 1 and thereby hold the latter out of engagement with the thermal protectors 9 9, and spring members 14 14 are adapted to engage the toothed shells 23 23 of thermal protectors 9 9, respectively, when the plug is inserted into the protective apparatus as shown in Fig. 1. Each battery 17 is connected in circuit with spring members 12 and 14 on one side of the plug, and is for the purpose of supplying current to a thermal protector 9 to heat same for operation when it is desired to test the protector.

In testing a thermal protector and resetting the protective apparatus to operative position, the testing and resetting plug is inserted into the apparatus as shown in Fig. 1, which closes the circuit of each battery 17 through spring members 12 and 14 and a thermal protector 9. The current from battery 17 soon heats the protector 9 and softens the easily-fusible material therein, whereupon spring member 14 turns the protector 9 and releases itself therefrom and takes the position 18 shown in Fig. 1. The current of battery 17 is now broken from the protector 9 and the latter cools. The testing plug may now be withdrawn from the protective apparatus, such withdrawal setting the portions 10 10 of spring members 1 1 into engagement with the toothed shells 23 23 of the thermal protectors 9 9 and thereby setting the protective apparatus for operation. Either one or both of the protectors 9 9 may be tested with one insertion of the plug. When the testing plug is inserted into the protective apparatus, both spring members 14 14 are manually pressed into engagement with the thermal protectors 9 9 if it is desired to test both of the latter. If it is desired to test only one protector 9, then one spring member 14 only is depressed. If is is not desired to test either of the protectors 9 9, then neither of the spring members 14 14 is depressed.

The testing plug may be used simply as a means for testing the line and switchboard circuits, conductors 19 19 being connected with line springs 2 2 for testing the line circuit, and conductors 20 20 being connected with switchboard springs 1 1 for testing the switchboard circuit. Conductors 19 19, 20 20, may be connected to any suitable switch and testing instrument.

When the thermal protectors 9 9 are heated and operated by a current through the testing plug, as described above, such operation shows that the protectors 9 9 are in condition to be operated again when the apparatus is reset. If the protectors 9 9 do not properly heat and operate by current supplied through the testing plug, it shows that they are not in condition to be operated when the apparatus is reset, and should therefore be replaced by new protectors.

The testing plug may be inserted into the protective apparatus whether same is in a set or operated position. If the apparatus is in operated position, the free ends of springs 13 13 will pick up the portions 16 16 of switchboard springs 1 1 and reset the portions 10 10 into engagement with the protectors 9 9 when the plug is removed from the apparatus. Each spring 13 on the testing plug is preferably provided with a hole 21 therein adapted to accommodate the point 22 of portion 16 of spring member 1, so as to allow spring 13 to substantially engage the portion 16. The point 22 projects somewhat into the hole 21.

I do not wish to limit this invention to the exact details of construction, nor to the particular thermal protectors 9 9, herein shown and described.

What I claim as my invention and desire to secure by Letters Patent, is:

1. A testing and resetting device for an electrothermal device of the character described, comprising means for applying current to the electrothermal device to heat same and for operating same when thus heated, the said resetting device being constructed to reset the electrothermal device in circuit for operation when removed therefrom.

2. A testing device for a heat-cartridge operable in a given direction, comprising means for applying current to the cartridge to heat same, and for operating the cartridge still farther in the same direction when thus heated, as a test on the latter.

3. A testing device for a rotary heat-cartridge rotatable in a certain direction upon abnormal current conditions, comprising means for applying current to the cartridge to heat same, and for turning the cartridge still farther in the same direction when thus heated, as a test on the cartridge.

4. A testing device for telephone protective apparatus having thermal protectors, comprising means for making electrical connections with the apparatus for testing the line and switchboard circuits separately and means for applying current to a thermal protector and for operating same when heated, as a test on the protector.

5. A device to be applied to electrical protective apparatus, comprising means for making electrical connections for testing the several circuits through the apparatus separately, and means for heating and operating a protector of the apparatus, the said device being constructed to reset the apparatus for operation when removed therefrom.

6. A testing device for electrical protective apparatus having a thermal protector, comprising means for making electrical connections with the apparatus for testing the several circuits therethrough separately and means for applying current to the protector to heat same and for operating same when heated, as a test on the protector.

7. A testing and resetting device for a rotary heat-cartridge having a series of engaging devices and means for engaging an engaging device to operate the heat-cartridge under abnormal current conditions, comprising means for applying current to the cartridge to heat same, means for operating the heat-cartridge when same is heated and thereby bringing the said engaging devices successively into engaging position for their engaging means, and means for resetting the said engaging means into engagement with an engaging device for another operation.

8. A testing device for an electro-thermal protector, the latter having means engaged therewith to operate same under abnormal current conditions, comprising means for bearing the said engaging means out of engagement with the protector, means for applying current to the protector to heat same, and means for operating the protector as a test thereon when same is suitably heated.

As inventor of the foregoing, I hereunto subscribe my name in the presence of two subscribing witnesses, this 16th day of May, 1906.

FRANK B. COOK.

Witnesses:
FREDERICK R. PARKER,
C. C. NEWBURN.